April 7, 1936.  T. H. KRUEGER  2,036,583
TURNTABLE CARTON SEALING DEVICE
Original Filed Oct. 1, 1929   5 Sheets-Sheet 1

INVENTOR
Theodore H. Krueger.
BY
Moses & Nolte
ATTORNEYS.

April 7, 1936.  T. H. KRUEGER  2,036,583
TURNTABLE CARTON SEALING DEVICE
Original Filed Oct. 1, 1929  5 Sheets-Sheet 3

INVENTOR
Theodore H. Krueger.
BY
Moses & Nolte
ATTORNEYS

April 7, 1936.  T. H. KRUEGER  2,036,583
TURNTABLE CARTON SEALING DEVICE
Original Filed Oct. 1, 1929  5 Sheets-Sheet 4

INVENTOR
Theodore H. Krueger.
BY
Moses & Nolte
ATTORNEYS

Patented Apr. 7, 1936

2,036,583

UNITED STATES PATENT OFFICE 2,036,583

TURNTABLE CARTON SEALING DEVICE

Theodore H. Krueger, Stratford, Conn., assignor to Better Packages Incorporated, Shelton, Conn., a corporation of New York Original application October 1, 1929, Serial No. 396,446. Divided and this application July 28, 1933, Serial No. 682,602. In Canada September 19, 1930

20 Claims. (Cl. 216—29)

My present invention relates to improvements in devices for applying gummed tape to articles such as boxes and the like and is a division of an application filed by me on October 1, 1929, No. 396,446, and patented July 24, 1934, No. 1,967,578. While susceptible to other uses, my improved device is particularly adapted to apply gummed tape around the sides of large heavy boxes such as boxes of the type containing one or more reams of paper and I have described my invention as it is embodied in this form. Such boxes often weigh as much as several hundred pounds and obviously cannot be handled and taped in the manner of ordinary light packages. The object of the present invention is to provide simple and convenient apparatus by which such heavy packages may be handled while the sealing strip is applied thereto. I have found that this result can best be accomplished by means of a turntable adapted to support the box and which may be rotated by hand while the strip of gummed tape, fed in a vertical plane, is applied to the sides of the box. The principal object of the invention is to provide a turntable of this character upon which the box may be supported and rotated, means being provided to feed the tape in a vertical plane to the box. The weight of the box may be relied upon to retain the same in position upon the turntable but if desired the turntable may be provided with gripping means for holding the box and it is a subsidiary object of my invention to provide gripping means suitable for use in connection with the turntable when desired.

My invention will be best understood by the following detailed description of one specific embodiment thereof taken with the annexed drawings in which.

Figures 11, 12, 13, 14:
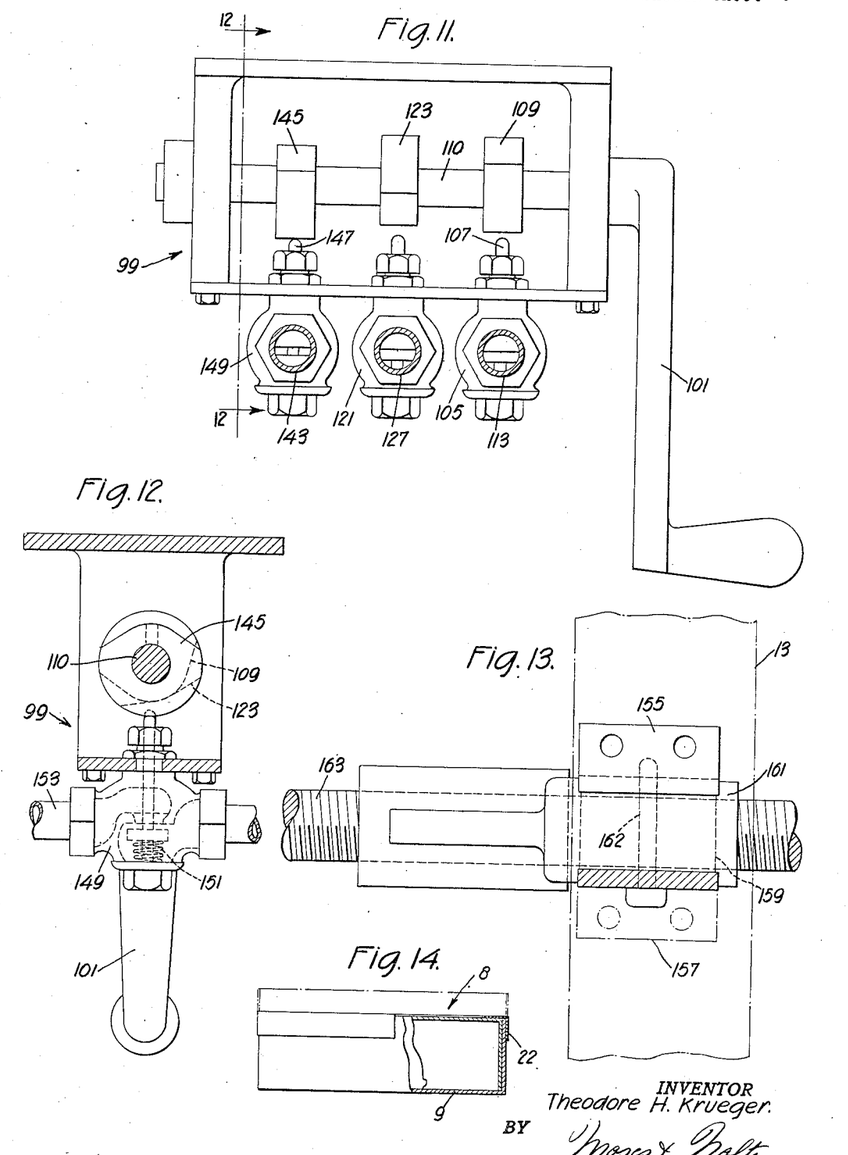
Figure 11 is a view of the valve control unit for the two sides and one end box-gripping devices.
Figure 12 is a view taken along section 12—12 of Figure 11.
Figure 13 is a detail of the end gripper support showing means for holding same for adjustment in both vertical and horizontal positions.
Figure 14 is a view partly in section of a taped box.

A box 8 of the type intended to be wrapped or sealed by the present mechanism is shown in Figure 14. Prior to reaching the machine the box is filled with paper or other contents and the cover 9 is put on at a station not shown in the drawings, and it is then conveyed to the machine in any suitable manner, as by means of the roller conveyor 10 which is slightly inclined downwards towards the turntable to be described. Preferably the covered box is placed on the conveyor upsidedown and discharged in that position upon the turntable.

*The turntable.*—The box is received upon the turntable 11 which supports the box in position to have the sealing tape 22 applied thereto by rotation of the turntable. The turntable is supported for rotation upon a base 73, as shown particularly in Figure 6. The base 73 is provided with a bearing member 75 which is secured thereto by bolts 77. On the underside of the turntable is a sleeve 97 in which is fitted a hollow spindle 93 which is rotatable in the bore of the bearing member. The lower end of the sleeve 97 bears upon the top of the bearing member 75, a suitable anti-friction bearing means (not shown) being interposed between the elements 97 and 75, if desired. The turntable may be manually rotated by the operator as the sealing tape is applied to the side of the box in the manner to be described, or any suitable power driven means under the control of the operator may be utilized for rotating the turntable. For instance a power driven friction wheel (not shown) which may be moved into and out of driving engagement with the periphery of the turntable by means of a foot treadle or the like is suitable. It is desired to have the rotation of the turntable completely and instantly under the control of the operator so that the rotation may be regulated as the tape is applied and so as to prevent "whipping" of the tape as the same is carried around the corners of the box.

*Box gripping means.*—Where it is desired to provide means for holding the box upon the turntable (other than the mere weight of the box) gripping elements are provided on the turntable which preferably grip the four sides of the box. A rear gripping element 13 is provided against which the end of the box is brought snugly as it rolls on the table from the conveyor 10. In addition to the element 13 there are provided side gripping elements 15 and 17, and front gripping elements 19 and 20, the latter being raised at the proper time from a lower retracted position by means to be described. The purpose of elements 13 to 20 mentioned is (1) to center the box on the table; (2) to obtain a thorough hold upon the box whereby it may be rotated with the table; and (3) to compress the sides of the cover firmly against those of the box proper prior to the application of the gummed tape 22. This tape is applied to the box at the lower edge thereof (the box being inverted) as shown in Figure 14, a part of the width of the tape projecting above the box as shown in dotted lines so as to provide a portion of the tape for folding over on the bottom of the box as is also clearly shown in this figure. The mechanism accomplishing this gripping of the box may now be described.

Figure 8:
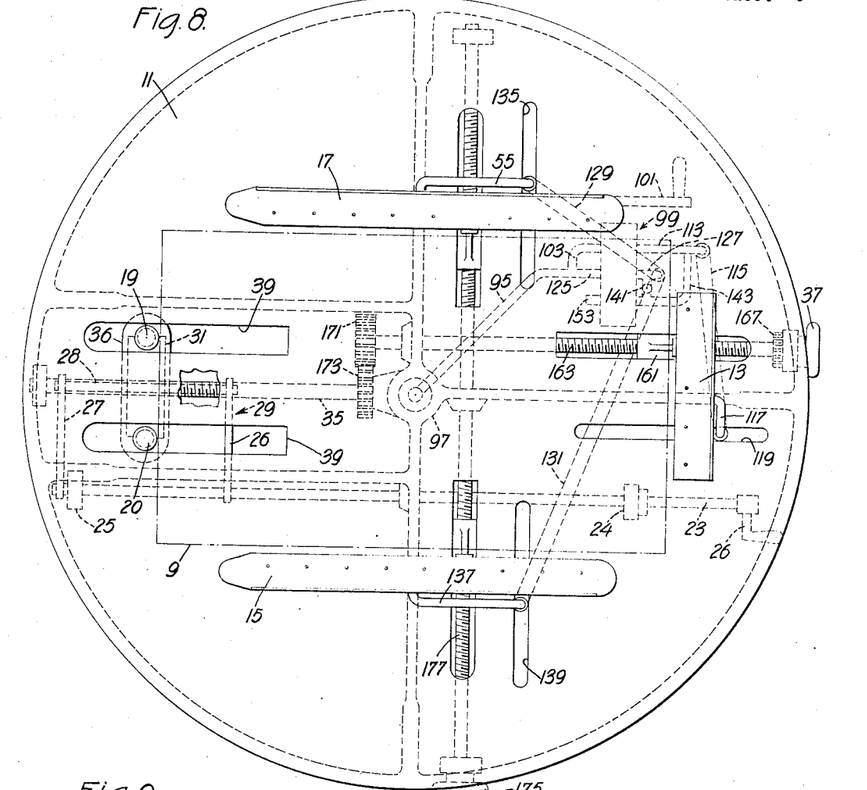
Figure 8 is a top plan view of the turntable and associated parts.

*Fingers 19 and 20.*—The mechanism involving these elements is best shown in Figures 2, 3, 5, 7 and 8. As mentioned, these fingers are to be raised after the box has moved thereover and are to be lowered when the box is to be released from the turntable. Mechanism for raising the fingers 19 and 20 comprises a rock shaft 23 supported in brackets 24 and 25, said rock shaft being provided at one end with a handle 26 by which it may be manipulated. At the other end of the rock shaft are two arms 26a and 27 having connected thereto a rod 28 forming a bail-like element indicated generally by numeral 29. Rod 28 of said bail extends through an elongated slot 30 of a block 31 to which the gripping fingers 19 and 20 are adjustably secured by screws 32 which may extend through apertures 33 in the fingers. Thus it will be understood that by rocking the shaft 23 by means of the handle 26 the fingers 19 and 20 may be raised or lowered through the medium of the bail 29 which engages the block 31. Adjustment of fingers 19 and 20 in the plane of the turntable for varying lengths of boxes is accomplished by means of a feed screw 35 whose movement is controlled by a knob 37 to be described; said screw being threaded through a block 36 in which the fingers 19 and 20 are guided. To accommodate the adjusted movement of fingers 19 and 20 the table is provided with slots 39 as shown in Figure 8.

Figures 9, 10:
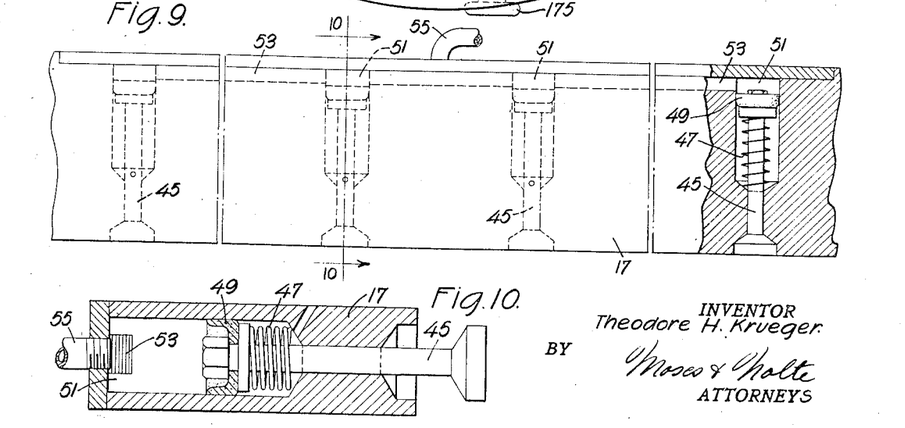
Figure 9 is an enlarged top plan view partly in section of one of the side box-gripping elements seen in Figure 8 showing the box gripping plungers in retracted position.
Figure 10 is an enlarged view as would be seen along section 10—10 of Figure 9 when the plungers are in extended position, Figure 9.

*Gripping elements 13, 15 and 17.*—These elements are of substantially identical construction except that element 13 is shorter than the other two so that the following description of element 17 will serve for all of them. The gripping function of these elements is accomplished preferably by means of a plurality of plungers 45 (Figures 9 and 10) pneumatically operated against the action of springs 47. In the construction shown, each plunger 45 comprises a head or piston including a packing 49 of flexible material which moves in a cylindrical bore 51. Reference to Figure 9 will indicate that bores 51 communicate with one another through a duct 53 fed by air under pressure through a pipe 55.

It is a special function of these pneumatic gripping elements to hold the sides of the cover of the box firmly against the sides of the box itself as the tape is applied. Large boxes of the character for which the present machine is intended are usually made of such heavy fibre board or other material that the sides of the cover refuse to lie flat against the sides of the box unless firmly forced into contact therewith. Accordingly, if the tape is applied while the sides of the cover stand away from the sides of the box there will be a space underneath the center of the tape which weakens the seal and will also result in unsightly wrinkling of the tape after the box has been handled in transit. The pneumatically controlled grippers obviate this difficulty and enable pressure to be exerted on all sides of the box simultaneously and without loss of time.

*Mechanism for feeding air to gripping devices.*— Air is compressed in a compressor 61 (Figures 2 and 3) driven by an electric motor 63 and belt 65. Air from the compressor is conveyed through a pipe 67 to a tank 69. Air from said tank 69 is fed through a pipe 71 to the base 73 of the turntable and shown best in Figure 6. It will be obvious that special means must be provided for conveying the air to the rotatable turntable from the stationary tank and piping. This is accomplished by means including the bearing member 75 for the turntable which member preferably comprises a separable section 81 secured by means of bolts 83 and receiving air pipe 71. Member 81 also includes a stuffing box comprising a perforated annular retaining member 85 holding in place a series of packing rings 87. Retaining member 85 rests against a bottom plate 89 secured to member 81. Between members 75 and 81 I preferably interpose a ring 91 which extends inwardly so as to afford an abutment for the packing 87 which is thus held in place between said abutment and said retaining member 85. Air then passes through pipe 71, to a chamber formed by member 81 through the hollow spindle 93 of said turntable and thence to an outlet pipe 95. It will be noted that pipe 95 is threaded directly into the hollow spindle 93 passing through an opening in the sleeve 97. Said pipe 95 leads to an air valve and distributing mechanism denoted generally by 99 (Figs. 8, 11 and 12) controlled by a handle 101 within reach of the operator.

*Air valve 99 and air connections with gripping elements 13, 15 and 17.*—The air passes from the pipe 95 through a branch 103 (Figure 8) to a valve 105 (Figure 11), the valve being provided with a stem 107 which may be depressed by a cam 109 secured to a cam shaft 110 rotatable by the handle 101. Upon the depression of the stem 107 to open the valve 105 air passes therethrough from the branch 103 through a pipe 113 which may be connected by a flexible tube 115 with a pipe 117 extending upwardly through a slot 119 in the table, said pipe 117 being connected with the gripping device 13, thus causing the plungers of the gripping device 13 to be thrust against the end of the box, the box now being held against fingers 19 and 20 which at this time are in raised position. Upon a further rotation of the cam shaft 110 by the handle 101, the valve 105 is permitted to close and an adjacent valve 121 is similarly opened by a cam 123 also secured to the cam shaft 110. Thus the air passes from the pipe 95 through a branch 125 (Figure 8) through the valve 121 to a pipe 127 which connects to two hose sections 129 and 131, the tube or hose section 129 being connected to the pipe 55 which extends upwardly through a slot 135 in the table 10 and which is connected to the gripping section 17. The other hose section 131 is similarly connected through a pipe 137 with the gripping device 15, said pipe extending upwardly through a slot 139. Thus it will be understood that by opening the valve 121 the plungers of the gripping sections 15 and 17 are operated simultaneously to grip the opposite sides of the box. It will also be seen that by the arrangement of the cams on shaft 110 the end gripping device 13 is operated prior to those of side gripping devices 15 and 17 thus enabling the box to have its endwise movement before the pressure is applied to the sides of the box.

The release of the box which would occur after the taping operation is brought about as follows: A cam 145, secured to the shaft 110, upon a further actuation of the handle 101 acts on a plunger 147 of a valve 149 to open the latter against the action of a spring 151 (Figure 12) thus releasing the air from the gripper sections 13, 15 and 17 through a duct 143 and vent 153.

A check valve 141 is provided in the connection between ducts 127 and 143 for the following reasons: As stated, it is desirable that the end-grippers 13 operate before the side-grippers 15 and 17. If it were not for the check valve 141, when the valve in duct 113 was operated to feed air to the end-grippers 13, such air also would flow through the duct 127 and hence to pipe 131 by passing through the exhaust duct 143. However, when the valve 145 is operated to release the air in the grippers, that from the side-grippers is allowed to pass through the exhaust duct 143 in the reverse direction through the valve 141. It will be understood that the handle 101 may be held in any position to which it is moved, by suitable means, not shown.

Figure 3:
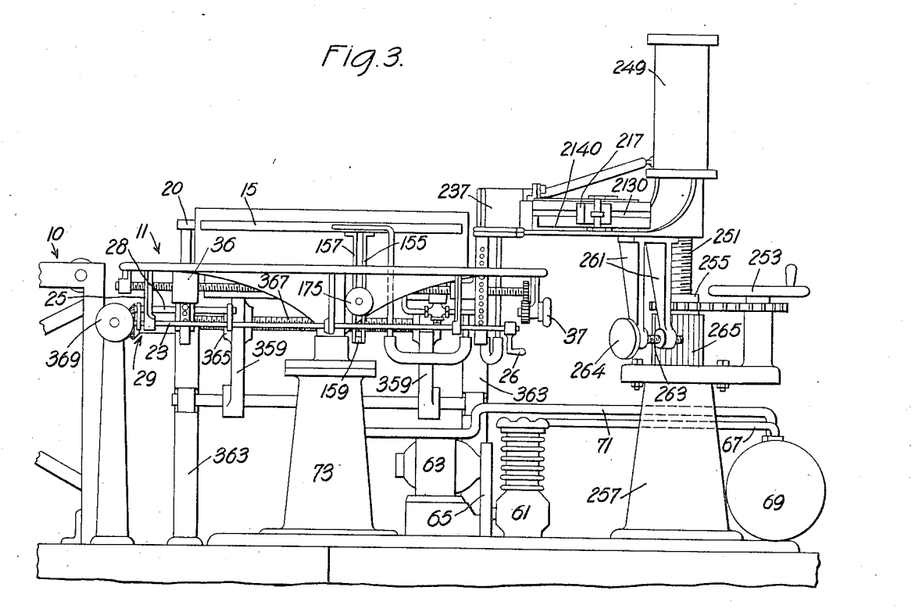
Figure 3 is a front elevational view of the same.
Figures 5, 6, 7:
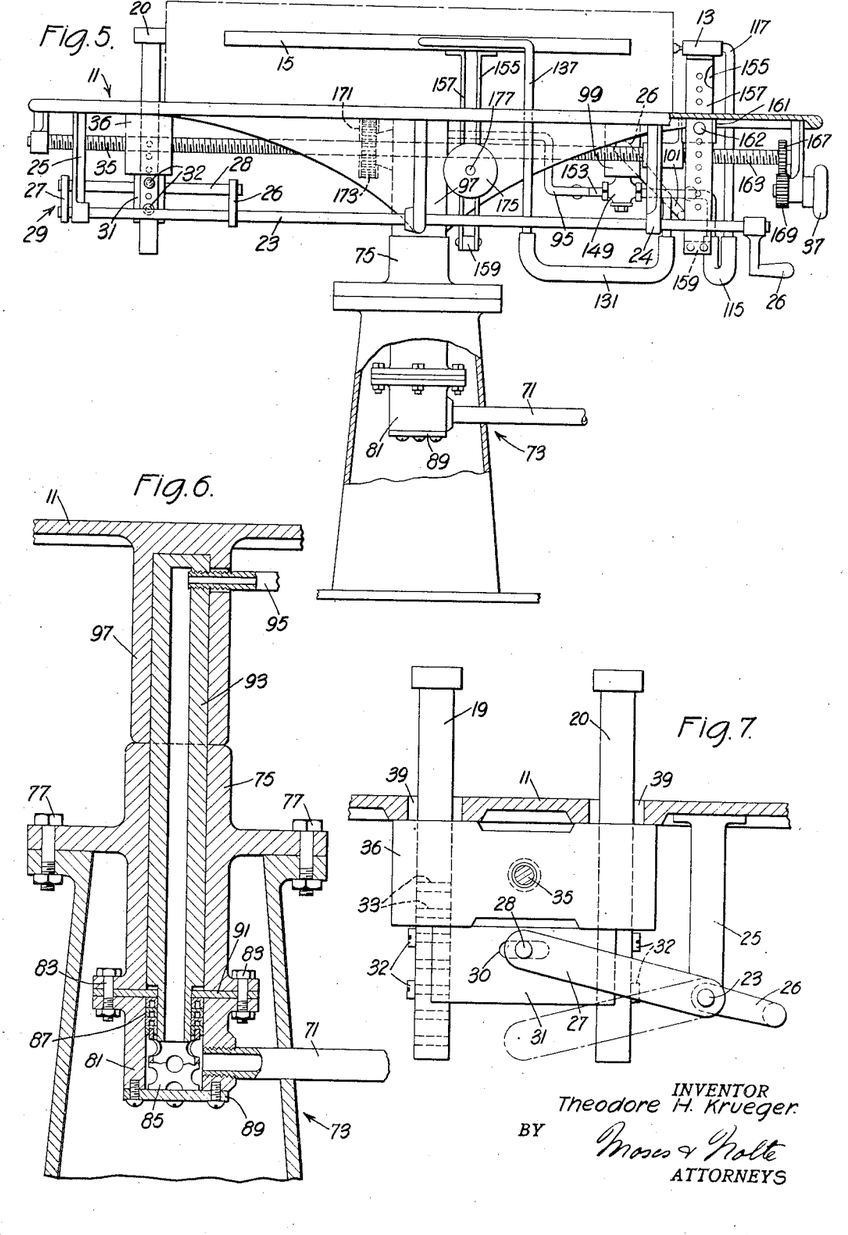
Figure 5 is a front elevational view of the turntable and various of the parts carried thereby.
Figure 6 is an enlarged view in section taken centrally through Figure 5 on a vertical plane parallel with the paper.
Figure 7 is a detail of the end box-gripping fingers and means for raising and lowering the same.

*Adjustment of grippers 13, 15 and 17.*—For the purpose of accommodating different sized boxes the position of the grippers is made adjustable. It will be apparent that adjustment should be provided not only for boxes of varying length and width but also for those of different heights. These various adjustments are accomplished as follows: Referring to Figures 5 and 13, gripper 13 is mounted upon a pair of bracket members 155, 157. The latter which extend vertically downward as shown in Figure 3 are connected at the bottom ends by spacing member 159 and are adjustably secured to block 161 by a removable pin 162 passing through said bracket members 155, 157 and said block 161, (Figures 5 and 13). Block 161 is carried by feed screw 163 connected to handle 37. Due to the fact that said bracket members 155, 157 are provided with a series of such pin accommodating apertures throughout the length thereof, the height of said brackets and hence of said gripping member may be varied. It will also be apparent that by means of feed screw 163 the position of said gripper laterally of the table may also be varied. Feed screw, however, is not directly connected to knob 37 but has interposed therebetween a pair of gears 167 and 169 which provide for the knob to be turned clockwise for example, for the purpose of feeding the gripping elements together. By means of gears 171 and 173, respectively, attached to feed screw 163 and feed screw 35, by turning knob 37 both fingers 19 and 20 and gripper 13 are moved toward and away from each other simultaneously. Grippers 15 and 17 are similarly mounted on brackets 155 and 157 (Figure 5) and by means of a knob 175, feed screw 177 and mechanism similar to that described with reference to gripper 13, grippers 15 and 17 are adjusted toward and away from one another.

Figure 1:
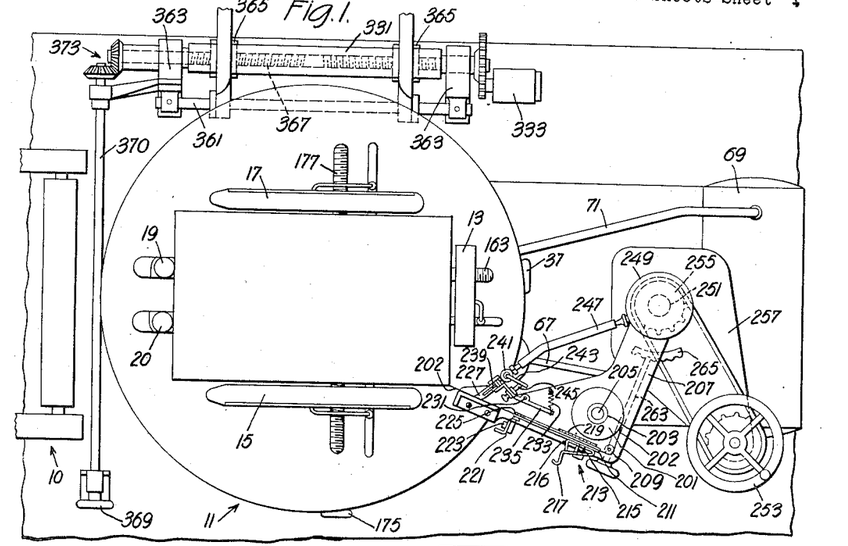
Figure 1 is a top plan view of my improved machine.
Figure 4:
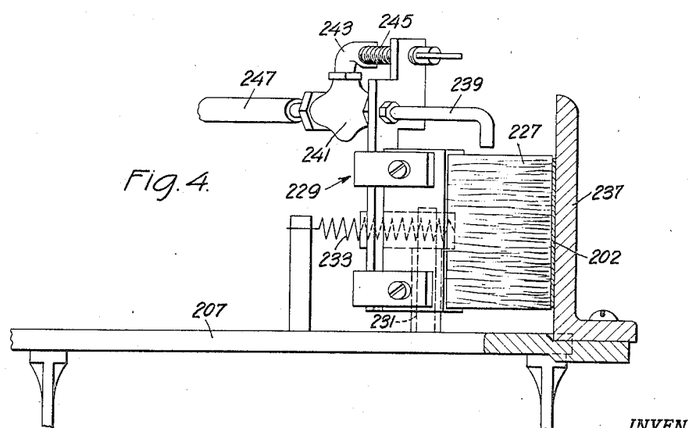
Figure 4 is an enlarged view in elevation of the tape moistening device, the backing plate being shown in section.

*Gummed tape feeding and moistening device.*—This is seen best in Figures 1, 3 and 4. At this portion of the machine the feed of the gummed tape is initiated by manual means, the tape is moistened and the end of the tape is fed into position to be applied to the box. Means are also provided for severing the strip of tape after the operation of applying the tape to the box. In this portion of the machine, I preferably utilize certain elements of the tape feeding device described and claimed in my prior patent No. 1,638,816, dated August 9, 1927, to which reference may be had.

Referring particularly to Figure 1, 201 indicates the roll of gummed tape having a core 203 accommodating a spindle 205 secured to a frame 207. Tape 202 is fed from said roll and passes over a guide pulley 209 and thence through a guideway 211 similar in construction to that shown in my prior Patent No. 1,638,816, aforesaid. To initiate the feed of the tape a gripping device 213 is provided which is pivoted at 215, and has a gripping jaw 216. Said device also includes a backing plate 219 carrying ears forming bearings for pivots 215 and against which plate the gummed tape is pressed by the gripping jaw 216, when the handle 217 is operated. A suitable spring, not shown, is provided for returning handle 217 to its non-gripping position.

The operation of this feed device, while more clearly shown in said prior patent, may, nevertheless, be understood from the following: Carriage 213 is formed so as to travel along guideways 2130, Fig. 3, at the top and bottom thereof. The outer guides 211 between which the tape travels are provided with a slot 2140 which accommodates the gripping jaw 216. Thus, when the handle 217 is pushed inwardly, the jaw 216 grips the tape against the backing 219 so that when the carriage as a whole is pulled to the left in Fig. 1 the tape is constrained to follow it. When the end of the travel of the feed device is reached, it is returned manually to its initial position as seen in Figure 1. For severing the tape a knife 221 is provided which is pivoted at 223. Knife 221 cooperates with a stationary shearing edge 225 behind the tape.

*Moisture applicator.*—The tape during its travel is moistened preferably by means of a brush 227, seen best in Figure 4. Brush 227 is held in place by means of a supporting bracket 229 which is movable on a pivot 231. A spring 233 attached to a member 235 of said bracket urges the brush against the tape which is supported by means of a vertically extending plate 237. Also attached to bracket 229 is a drip faucet 239 placed immediately above the brush and communicating with a valve 241 also supported on said bracket 229. Valve 241 has a handle 243 and cooperating therewith is preferably an adjustable stop 245 by means of which the position of the valve handle may be accurately maintained. To turn the water off the handle 243 is moved parallel with the faucet 239 but upon being turned on is moved against the stop 245 thereby opening the valve to the predetermined degree fixed by the adjustment of the stop. Communicating with the valve 241 is a flexible hose 247 connected to a reservoir 249.

This manner of applying moisture to the brush has the advantage that such moisture is applied practically as even at the top as at the bottom of the brush. Where wicks, for example, are employed for this purpose, this evenness of application, particularly at high speeds of the tape, cannot be had.

The construction described for moistening the tape is not claimed in this application as it forms the subject matter of the original application of which this is a division.

To provide for adjustment of the tape feeding and moistening device to accommodate different heights and flat areas of boxes, the unit is adjustable as a whole vertically with respect to the table 11 through a screw 251 upon which the unit is supported, as seen best in Figures 1 and 3. To facilitate this adjustment, a hand wheel 253 is provided having a chain and sprocket connection with a nut 255, rotation of which thus alters the height of the unit. The supporting pedestal for the tape feeding and moistening unit is shown in these figures and is indicated by reference character 257.

The moistening unit is also adjustable angularly about the axis of the screw 251. As seen in Figure 3, a pair of depending brackets 261 are provided which contain a set screw 263 operable by a knob 264; the set screw cooperating with a corrugated plate 265 of sector shape (see Fig. 1) attached to the pedestal 257. When the screw 253 is entered into one of the corrugations, the unit is thus locked against rotation. When screw 253 is withdrawn from such corrugations, the unit may be rotated and thus vary the position of the feeding element with reference to the box on the turntable.

In use, the operator by means of the device 213 feeds out a length of tape for a portion of the length or width of the box, the tape being moistened as it passes the brush 227. He applies the end of the tape to the box and then rotates the table for one revolution which causes the tape to be fed out from the roll and to be applied around the box, the operator pressing the tape firmly against the box with his hands during or following its application. It will be noted that due to the fact that the tape is fed out in a vertical plane and in a horizontal direction, the tape once applied to a portion of the box will be fed out thereupon with the parallel edges of the tape in strict parallelism with the edges of the box. After the tape has been applied the top edge thereof is folded over by hand, the finished article being shown in Figure 14. It will be noted that due to the action of the box gripping device, the sides of the box will be firmly pressed in an inward direction so that when the tape is applied while the box is under this tension a very tight sealing action is thereby effected.

Figure 2:
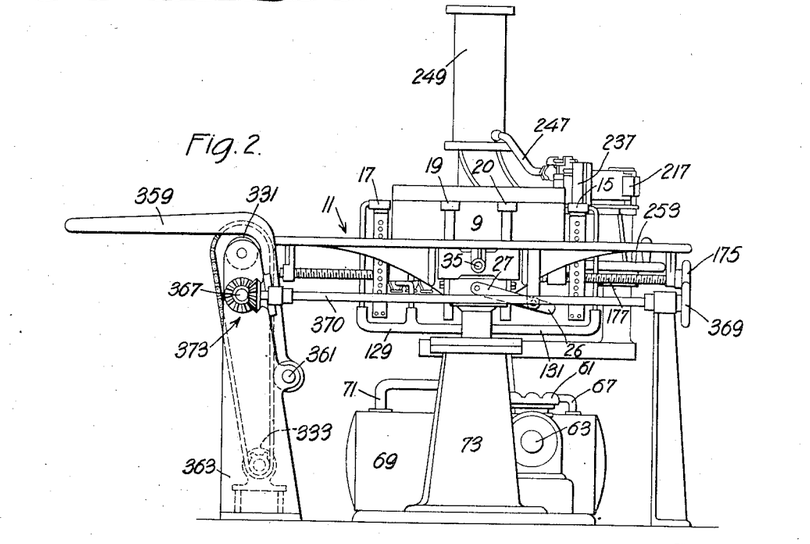
Figure 2 is an elevational view looking from the left of Figure 1, parts being omitted.

*Means for feeding boxes off the turntable.—* The boxes are fed from the turntable preferably by means of a continuously rotating roller 331, said roller being driven by means of an electric motor 333 and appropriate gearing shown (Figs. 1 and 2).

For the purpose of guiding the boxes onto the stacker, conveyor or other support (not shown), a pair of longitudinal guides 359 are provided. These guides, which are of approximate L-shape, are slidably supported on a rod 361 carried by a pair of brackets 363. To provide for varying the distance apart for these guide members 359 to accommodate different widths of boxes, said guide members are provided with ears 365 having a threaded connection with a shaft 367 (disposed beneath roller 331) provided with right and left hand threads. Rotation of said shaft to effect adjustment of guide members 359 is brought about by means of a knob 369 within reach of the operator and attached to a shaft 370 provided with a beveled gear connection 373 with said shaft 367.

The operation of the device is thought to be evident from the foregoing description but for the sake of clearness may be briefly recapitulated as follows:

The articles to be wrapped, as for example, reams of paper, have previously been placed on an electric elevator, not shown, which preferably always keeps the top of the ream pile at a height convenient for the operator to reach. The operator then places the reams in a box and then puts on the lid, the operation being such that the filled box falls upside down on the roller table 19, Fig. 1, and rolls onto the turntable 11 of the taping machine. The operator makes sure that the box corners are fully extended into the cover by manually wrapping the bottom of the box, whereupon he turns the handle 26, Fig. 8, which raises the fingers 19 and 20, and then turns handle 101, Fig. 8, to admit air first to the end gripping device 13 and then to the side gripping device 15 and 17. The action of the gripping devices is to force the four sides of the cover tightly against the box. Tape is now fed from the roll 201 by the operator pulling the handle 217 inwardly and to the left (Fig. 1), the tape being moistened as it is fed past the brush 227. A suitable length of tape having been fed out, the operator applies same along a portion of a side of the box. He then spins the table around which thus causes the tape to unwind from the roll and be applied around the box, the operator wiping the same with his hand as the tape is applied. The tape is then severed by means of the knife 221. The tape which has been applied so as to project above the bottom of the box as shown by the dot and dash lines of Fig. 14 is then folded down flat upon the bottom of the box as seen in the full lines of this figure. The turntable is now turned so as to bring the gripping members 19 and 20 opposite the roller 331. The operator then releases the air in the gripping devices by giving the handle 101 a further turn whereupon the wrapped box is released from the air operated grippers. He then moves the lever handle 26 to lower the fingers 19 and 20 carried by bellcrank 27 and gives the box a slight shove so as to bring it upon the continuously rotating roller 331 which causes it to feed from off the table. The use of the continuously driven box removing roller is a very desirable feature because the boxes for which the machine is intended are heavy and difficult to handle. There is only one direction in which the box can conveniently be removed from the table, and that is in a direction across the turn-table from the operator when he occupies his position for applying the sealing tape. By having the driven roller at the far side of the table from the operator's position, he merely has to push the box away from him until it is picked up by the rotating roller. It is accordingly unnecessary for the operator to walk around the table every time a box is to be removed or to provide an additional operator for the purpose of taking the box off of the table.

While I have illustrated and described in detail certain preferred forms of my invention, it is to be understood that changes may be made therein and the invention embodied in other structures, I do not, therefore, desire to limit myself to the specific constructions illustrated, but intend to cover my invention broadly in whatever form its principle may be utilized.

I claim:

1. In a machine of the character described, a turntable, adapted to support an article to be taped, means comprising a pair of opposed gripping devices for gripping the article and means controlled by the operator for actuating said gripping devices, and means presenting a gummed strip in a vertical plane to said article.

2. In a machine of the character described, a turntable, adapted to support an article to be wrapped, means comprising a pair of opposed gripping devices for gripping the article and means controlled by the operator for actuating said gripping devices, one of the members of said pair being retractable beneath the surface of the turntable, and means presenting a gummed strip occupying a vertical plane to said article.

3. In a machine of the character described, a turntable, means for receiving an article comprising pairs of opposed gripping devices, at least two of said devices comprising gripping members and pneumatic means for actuating same, and means presenting a gummed strip occupying a vertical plane to said article.

4. In a machine of the character described, a turntable, means for receiving an article thereupon comprising two pairs of opposed gripping members, one of said members being retractable beneath the surface of said table, the other three members having extensible gripping means and means controlled by the operator for actuating same, and means presenting a gummed strip occupying a vertical plane to said article.

5. In a machine according to claim 4 in which the gripping means are pneumatically operated and the control therefor is disposed upon a stationary part of the device.

6. In a machine of the character described, a turntable, means for receiving an article thereupon comprising two pairs of opposed gripping members, one of said members being retractable beneath the surface of said table, the other three members having extensible gripping means and common control means for said gripping devices, and means presenting a gummed strip occupying a vertical plane to said article.

7. In a machine of the character described, a turntable, means for receiving an article thereupon comprising two pairs of opposed gripping members, one of said members being retractable beneath the surface of said table, the other three members having extensible gripping means, pneumatic means for gripping said members and a common control for said gripping devices such that upon operation thereof said pairs of grippers are actuated one after the other, and means presenting a gummed strip occupying a vertical plane to said article.

8. In a machine of the kind described, a turntable for holding an article to be wrapped, pneumatic gripping devices, a stationary source of air and means for conducting said air from said source to said devices from the central axis of said turntable, and means presenting a gummed strip occupying a vertical plane to said article.

9. In a machine of the character described, a turntable, pairs of opposed gripping devices, at least three of said devices having extensible means carried thereby and means for actuating said devices, said gripping devices being adjustable to accommodate different sizes of articles to be gripped, and means presenting a gummed strip occupying a vertical plane to said article.

10. In a machine of the character described, a turntable, pairs of opposed gripping devices, at least three of said devices having extensible means carried thereby and means for actuating said devices, said gripping devices being adjustable to accommodate different sizes of articles to be gripped, and means for moving all said gripping devices for adjustment simultaneously toward and away from the center of the turntable, and means presenting a gummed strip occupying a vertical plane to said article.

11. In a machine of the character described, a turntable, gripping devices for holding thereon an article to be wrapped, said devices comprising a plurality of plungers, cylinders in which said plungers are movable and means for actuating said plungers comprising an air duct common to said cylinders, and means presenting a gummed strip occupying a vertical plane to said article.

12. In a machine according to claim 7 in which three air valves are provided, one for actuating one of said pairs of gripping devices, another for actuating another of said devices and a third valve for releasing the air in all of said devices.

13. In a machine of the character described, a turntable, pairs of opposed gripping devices. at least three of said devices having extensible means carried thereby and means for actuating said devices, said gripping devices being adjustable both vertically and horizontally to accommodate different sized articles, and means presenting a gummed strip occupying a vertical plane to said article.

14. In a device for sealing boxes having a cover enclosing the sides thereof, means for holding and compressing the sides of said cover against said box, means for rotating the box about an axis at right angles to the cover, and means for applying gummed tape to said cover while so compressed.

15. In combination, a turntable for receiving and supporting a box to be wrapped, said turntable being mounted to be rotated under the control of an operator about a substantially vertical axis, means mounted adjacent to one side of the turntable but not rotatable therewith for holding a roll of gummed tape, and means for presenting the end of the strip of gummed tape in a vertical plane in position for application to the vertical sides of the box, said means permitting the tape to be freely drawn therethrough at variable speeds whereby the tape when attached to the box may be drawn from the roll of tape by rotation of the turntable and box.

16. In combination, a turntable for receiving and supporting a box to be wrapped, said turntable being mounted to be rotated under the control of an operator about a substantially vertical axis, means mounted adjacent to one side of the turntable but not rotatable therewith for holding a roll of gummed tape, and means for presenting the end of the strip of gummed tape in a vertical plane in position for application to the vertical sides of the box, said means permitting the tape to be freely drawn therethrough at variable speeds whereby the tape when attached to the box may be drawn from the roll of tape by rotation of the turntable and box, the means for presenting the tape to the box including means for moistening the tape as it passes from the roll of tape to the box.

17. In combination, a turntable for receiving and supporting a box to be wrapped, said turntable being mounted to be rotated under the control of an operator about a substantially vertical axis, means mounted adjacent to one side of the turntable but not rotatable therewith for holding a roll of gummed tape, means for presenting the end of the strip of gummed tape in a vertical plane in position for application to the vertical sides of the box, said means permitting the tape to be freely drawn therethrough at variable speeds whereby the tape when attached to the box may be drawn from the roll of tape by rotation of the turntable and box, the means for presenting the tape to the box including means for moistening the tape as it passes from the roll of tape to the box, and means for adjusting the height of said tape presenting means and means for adjusting the position of same with respect to said turntable.

18. In the method of sealing a polygonal box having a cover, the sides of which enclose the sides of the box, the steps which consist in gripping the four sides of said cover and pressing said sides firmly against the sides of the box, providing a roll of gummed tape, applying an end of said tape to said box so as to overlie the edges of the sides of the cover and engage both the sides of the cover and a portion of the box, and rotating said box about an axis at right angles to the plane of the edge of the cover so as to draw tape from said roll of tape and cause the same to be applied around said box.

19. In the method as set forth in claim 18 the additional steps which include applying the tape around the box and cover in such a manner that the edge of the tape projects beyond the bottom of the box and then folding the projecting portion of the tape over upon the bottom of the box and causing it to adhere thereto.

20. In the method of sealing boxes, the steps which consist in placing the box upon a turntable, providing a roll of gummed tape, adhering the end of the tape to a side wall of the box and rotating the turntable and box under the control of an operator while maintaining the roll of tape in a relatively fixed position with respect to the box and turntable so as to cause the rotation of the box to draw the tape from the roll and apply it to the box.

THEODORE H. KRUEGER.